United States Patent
Niranjani et al.

(10) Patent No.: US 12,056,644 B2
(45) Date of Patent: Aug. 6, 2024

(54) RISK ASSESSMENT AND RESOLUTION FOR END DEVICE PORTING AND ACTIVATION

(71) Applicant: Verizon Patent and Licensing Inc., Basking Ridge, NJ (US)

(72) Inventors: Himanshu Niranjani, Moorpark, CA (US); Patrick John Gartner, Monroe, NJ (US); Angela Marie Janko, Highlands Ranch, CO (US); Rajyalakshmi Kamepalli, Alpharetta, GA (US); Kirstie Rivard, Littleton, CO (US); Rafael Ballesteros Bono, Snoqualmie, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 261 days.

(21) Appl. No.: 17/513,610

(22) Filed: Oct. 28, 2021

(65) Prior Publication Data
US 2023/0140023 A1    May 4, 2023

(51) Int. Cl.
| | | |
|---|---|---|
| *G06Q 10/00* | (2023.01) | |
| *G06Q 10/0635* | (2023.01) | |
| *H04L 41/00* | (2022.01) | |
| *H04L 41/0813* | (2022.01) | |
| *H04M 3/00* | (2024.01) | |
| *H04M 3/42* | (2006.01) | |

(52) U.S. Cl.
CPC ..... *G06Q 10/0635* (2013.01); *H04L 41/0813* (2013.01); *H04M 3/42297* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 2017/0161129 A1* | 6/2017 | Johnson | G06F 11/3006 |
| 2017/0353991 A1* | 12/2017 | Tapia | H04W 24/02 |
| 2018/0053181 A1* | 2/2018 | Noble | G06Q 20/363 |
| 2020/0265485 A1* | 8/2020 | Pachauri | G06Q 10/06398 |
| 2022/0012743 A1* | 1/2022 | Snell | H04W 12/72 |

* cited by examiner

*Primary Examiner* — Mustafa Iqbal

(57) ABSTRACT

A method, a device, and a non-transitory storage medium are described in which an onboarding risk assessment and remedial service is provided. The service may identify users that are having difficulty in completing an onboarding procedure and may be wasting end device and/or network device resources due to unsuccessful attempts to complete the onboarding procedure. The service may calculate an onboarding risk value to identify certain users that are having the difficulty. The service may calculate the onboarding risk value based on calculated criteria values pertaining to an incomplete onboarding procedure. The service may identify potential root causes of errors that may occur during the incomplete onboarding procedure. The service may perform remedial procedures to correct the errors and facilitate the successful completion of the onboarding procedure.

20 Claims, 10 Drawing Sheets

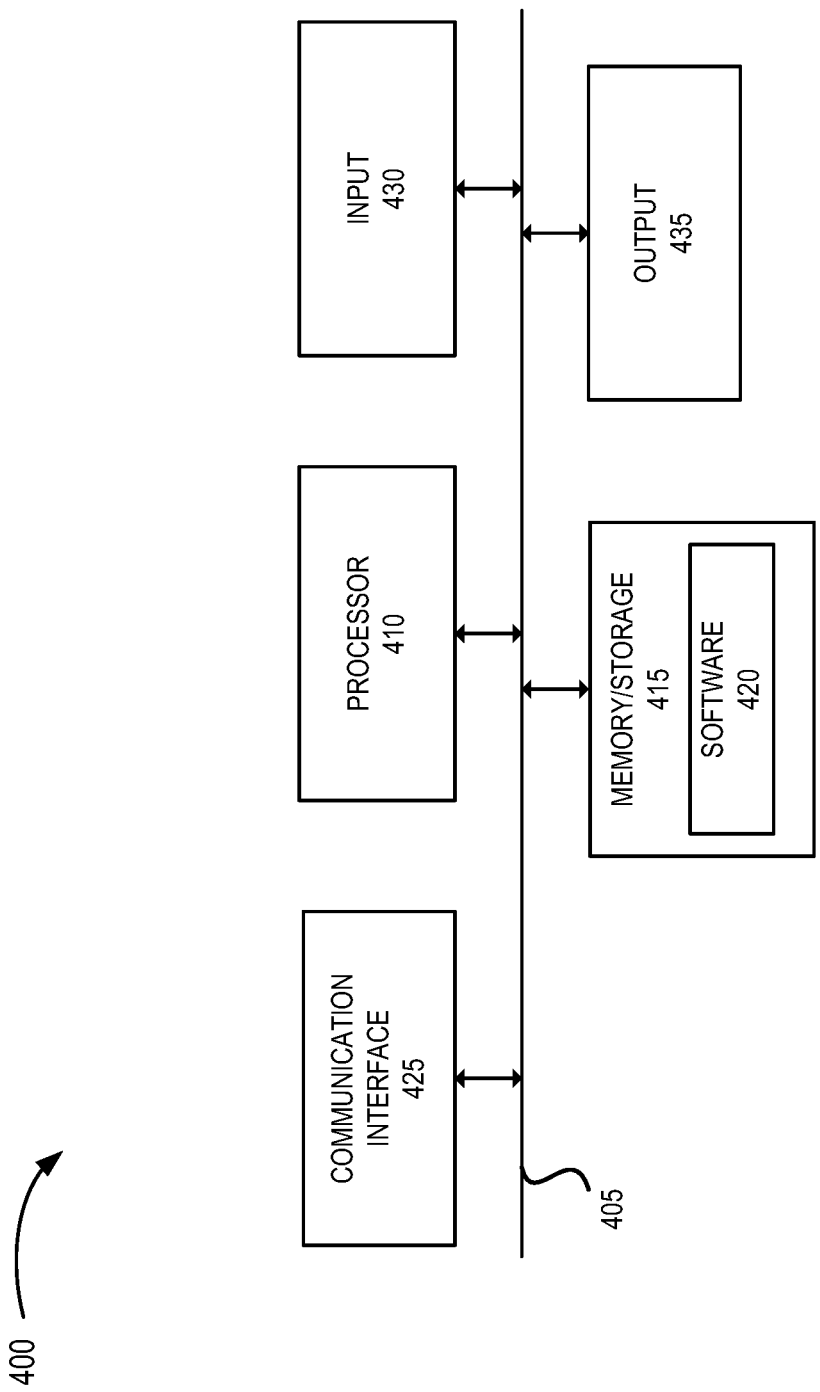

RISK ASSESSMENT AND RESOLUTION FOR END DEVICE PORTING AND ACTIVATION

BACKGROUND

Users of mobile devices, for example, may participate in an onboarding process. The onboarding process may include porting a telephone number associated with an end device and activating the end device for use on a network. For example, a user may change wireless service providers but wants to keep their current telephone number.

BRIEF DESCRIPTION OF THE DRAWINGS

FIG. 4 is a diagram illustrating exemplary components of a device that may correspond to one or more of the devices illustrated and described herein.

DETAILED DESCRIPTION

Figure 1:
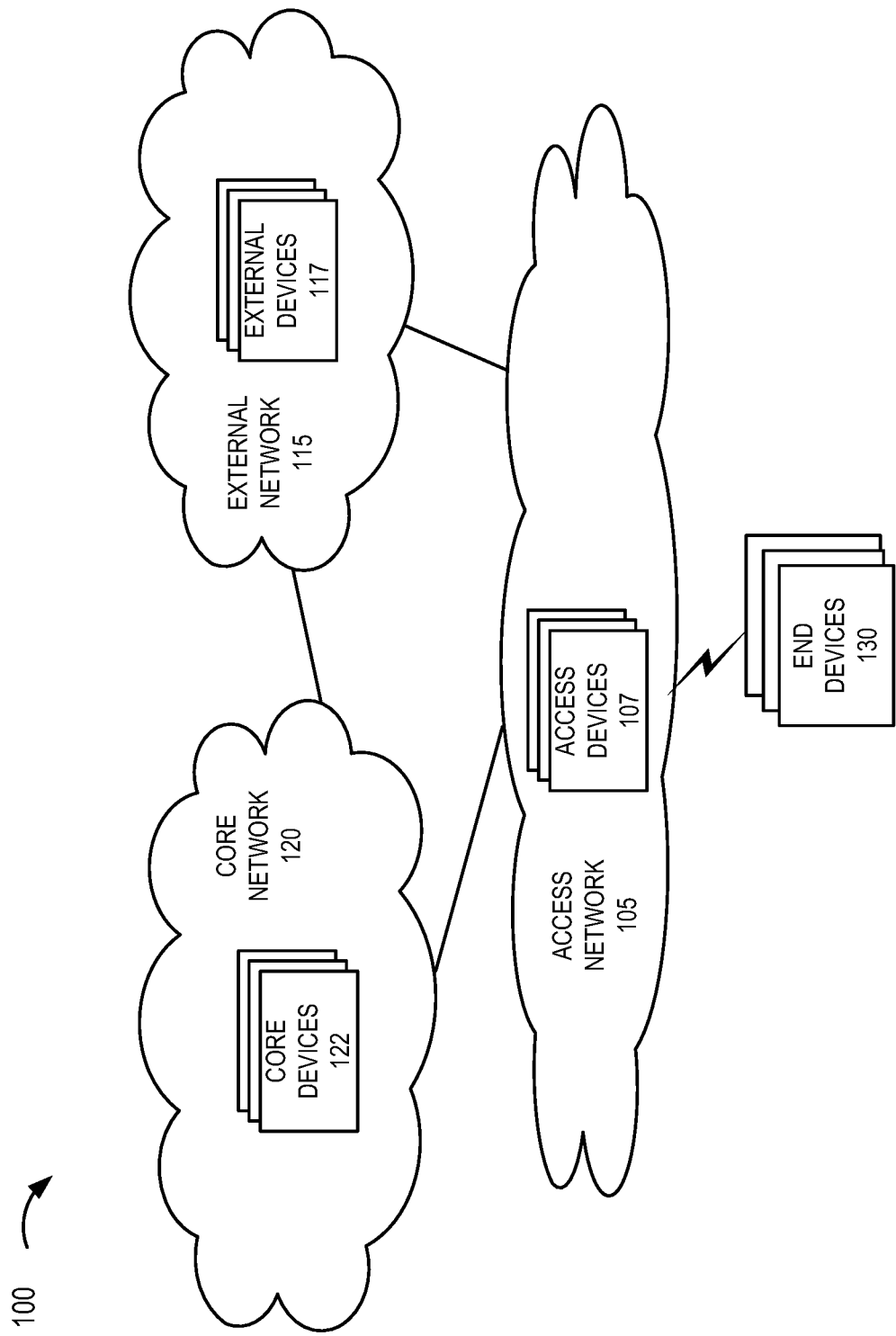
FIG. 1 is a diagram illustrating an exemplary environment in which an exemplary embodiment of an onboarding risk assessment and remedial service may be implemented.

The following detailed description refers to the accompanying drawings. The same reference numbers in different drawings may identify the same or similar elements. Also, the following detailed description does not limit the invention.

The term "carrier" and "service provider" may or may not indicate the same entity. However, for the sake of simplicity in providing description, these terms are used interchangeably. In this regard, for example, the term "carrier" may refer to a carrier, a carrier and a service provider, or a service provider. The converse is also true for the term "service provider."

Users of end devices, such as wireless end devices, may undergo an onboarding process. For example, a user may change between wireless carriers with an existing end device or a new end device, or the user may be with an existing wireless carrier and wish to activate a new telephone number that necessitates the onboarding process. The onboarding process may include porting a telephone number and activating or registering the end device with the ported telephone number onto a wireless network. According to various exemplary scenarios, an external carrier relative to a carrier to which a telephone number is to be ported may or may not use the carrier's network.

For some users, the onboarding process may yield unsuccessful results. For example, some users may have difficulty completing the onboarding process for various reasons. For example, a user may make a data entry error when initiating a request to have a telephone number ported between carriers. Additionally, or alternatively, there may be a system error relating to the configuration of a network device and/or end device that prevents successful completion of the onboarding process. On the other hand, some users may complete the onboarding process with few or no issues. However, the ability to proactively identify and assist those users that may need help to complete the onboarding process and establish service presents a technological challenge. For example, the selection and application of various criteria to determine when a user may need assistance relating to porting while identifying those users that do not need assistance is complex. Further, the ability to identify a problem and appropriate remedial action are necessary. An unsuccessful onboarding process may result in network-side and/or end device-side resources being wasted and may further trigger additional unsuccessful attempts to complete the on-boarding process, which may result in even further resources being wasted.

According to exemplary embodiments, an onboarding risk assessment and remedial service is described. According to an exemplary embodiment, the onboarding risk assessment and remedial service may evaluate and identify users that may need assistance in an onboarding of an end device. For example, the onboarding risk assessment and remedial service may identify users that may need assistance relating to porting and/or activating of the end device based on multiple criteria. According to an exemplary embodiment, the criteria may include values pertaining to the amount of time that has transpired since the user initiated an onboarding procedure, the previous wireless carrier associated with the user, the amount of time that has transpired between the user initiating an onboarding procedure and initiating assistance (e.g., user support), the number of times the user contacted user support, error codes associated with issues, and/or other criteria, as described herein. According to an exemplary embodiment, the onboarding risk assessment and remedial service may calculate a risk value based on the criteria values.

According to an exemplary embodiment, the onboarding risk assessment and remedial service may rank the users that may need assistance based on the multiple criteria. According to an exemplary embodiment the onboarding risk assessment and remedial service may proactively invoke remedial measures directed to the onboarding procedure associated with users of a threshold ranking. For example, the onboarding risk assessment and remedial service may identify one or multiple potential issues or problems that may be preventing the successful completion of the onboarding procedure based on the risk value, the one or multiple criteria values, and/or onboarding information associated with an incomplete onboarding procedure.

The onboarding risk assessment and remedial service may select one or multiple remedial procedures to execute based on the identified issue, problem, error, and/or failure, as described herein. For example, the remedial procedure may include configuring or reconfiguring logic of a network device and/or the end device that supports the onboarding procedure. According to other examples, the remedial procedure may include correcting data, initiating the correction of data, scheduling and/or communicating with users to perform certain tasks that may be deemed to remedy an issue or a problem associated with data entry errors. According to yet other examples, the remedial procedure may include generation of tickets that may specify various error codes that may be used to investigate or correct issues or problems regarding end devices or network devices that support the onboarding procedure.

In view of the foregoing, the onboarding risk assessment and remedial service may provide a programmatic and automated solution to prospectively identify users with onboarding issues and remedy these issues in an efficient and expedient manner. Consequential to identifying such users, the onboarding risk assessment and remedial service may optimize use of end device resources and network side resources by averting further failed attempts to complete an onboarding procedure. Accordingly, the onboarding risk assessment and remedial service may optimize use of resources relating to onboarding and support systems by expeditiously remedying difficulties some users may encounter with the onboarding procedure.

FIG. 1 is a diagram illustrating an exemplary environment 100 in which an exemplary embodiment of onboarding risk assessment and remedial service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or another type of network that may support a wireless service and/or an application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices, and the number of end devices 130 are exemplary.

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a fifth generation (5G) RAN, a future generation RAN (e.g., a sixth generation (6G) RAN, a seventh generation (7G) RAN, or a subsequent generation RAN), a centralized-RAN (C-RAN), and/or another type of access network (e.g., a legacy RAN, such as a fourth generation (4G) RAN, a 4.5G RAN, and so forth). Depending on the implementation, access network 105 may include one or multiple types of network devices, such as access devices 107. For example, access device 107 may include a next generation Node B (gNB), an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node, an open network device (e.g., O-RAN next generation Node B (O-gNB), an open-RAN (O-RAN) evolved Node B (O-eNB)), a 5G ultra-wide band (UWB) node, a future generation wireless access device (e.g., a 6G wireless station, a 7G wireless station, or another generation of wireless station), and/or another type of wireless node (e.g., a WiFi device, a WiMax device, a hotspot device, etc.) that provides a wireless access service. According to some exemplary embodiments, access network 105 may include a wired and/or an optical network.

External network 115 may include multiple networks of multiple types and technologies. For example, external network 115 may be implemented to include an application service layer network, a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a Voice over Internet Protocol (VoIP) network, a telephone network, a software defined network (SDN), a virtual network, a packet-switched network, a data center, or another type of network that may host an end device application, service, or asset (application service).

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines (VMs), SDN devices, cloud computing devices, platforms, and other types of network devices and/or architectures that provide an application service. External devices 117 may include network devices that provide other types of network-related functions (e.g., security, management, charging, billing, authentication, authorization, policy enforcement, development, etc.). External network 115 may include one or multiple types of core devices 122, as described herein.

External device 117 may host one or multiple types of application services. For example, the application services may pertain to broadband services in dense areas, IoTs, extreme real-time communications, lifeline communications, ultra-reliable communications (e.g., automated traffic control and driving, collaborative robots, health-related services, broadcast-like services, communication services, video streaming, and/or other types of wireless and/or wired application services. According to an exemplary embodiment, external network 115 may include external devices 117 that provide exemplary embodiments of the onboarding risk assessment and remedial service, as described herein.

Core network 120 may include one or multiple networks of one or multiple network types and technologies. Core network 120 may include a complementary network of access network 105. For example, core network 120 may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), an access and management mobility function (AMF), a session management function (SMF), a unified data management (UDM), a unified data repository (UDR), an authentication server function (AUSF), a network slice selection function (NSSF a policy control function (PCF), a network data analytics function (NWDAF), a network exposure function (NEF), a mobility management entity (MME), a packet gateway (PGW), a serving gateway (SGW), a home subscriber server (HSS), an authentication, authorization, and accounting (AAA) server, a policy and charging rules function (PCRF), a policy and charging enforcement function (PCEF), a charging system (CS), and/or other types of core devices that may support functionality of core network 120.

End device 130 may include a device that has communication capabilities. End device 130 may be implemented as a mobile device, a portable device, a stationary device (e.g., a non-mobile device and/or a non-portable device), a device operated by a user, and so forth. For example, end device 130 may be implemented as a smartphone, a mobile phone, a personal digital assistant, a tablet, a netbook, a phablet, a wearable device (e.g., a watch, glasses, etc.), a computer, a gaming device, a music device, an IoT device, a drone, a smart device, or another type of device (e.g., other type of user equipment (UE)). End device 130 may be configured to execute various types of software (e.g., applications, programs, etc.). The number and the types of software may vary among end devices 130. According to an exemplary embodiment, end device 130 is not to be considered a network device, as described herein.

According to exemplary embodiments, the onboarding risk assessment and remedial service may pertain to end device 130, which includes telephone capabilities (e.g., wireless telephone, VoIP, wired or landline telephone), and an onboarding procedure of such end device 130. As described herein, end device 130 may include logic that enables end device 130 to perform one or multiple operations or steps of the onboarding procedure. For example, a mobile phone, a cell phone, or a smart phone may include a (dedicated) application, which facilitates registration/activation with a network (e.g., access network 105, core network 120, etc.) with a new SIM and associated ported telephone number. Also, for example, end device 130 may include a client application (e.g., a web browser), or another type of end device application that may facilitate communication with a network device of a service provider and/or a carrier, as well as facilitating a step of the onboarding procedure. However, as described herein, other types of end devices 130 (e.g., a laptop, etc.) may include logic to perform one or multiple steps of the onboarding procedure for such end device 130 (e.g., mobile phone, etc.). For example, a desktop computer may include a client application that enables a user to facilitate the onboarding procedure on behalf of the mobile phone, the cell phone, the smart phone, etc., via a service provider's web service, or other available steps that may occur, such as communicating with service provider support associated with a service and the onboarding procedure, enabling instant messaging chat sessions, and so forth.

Figure 2:
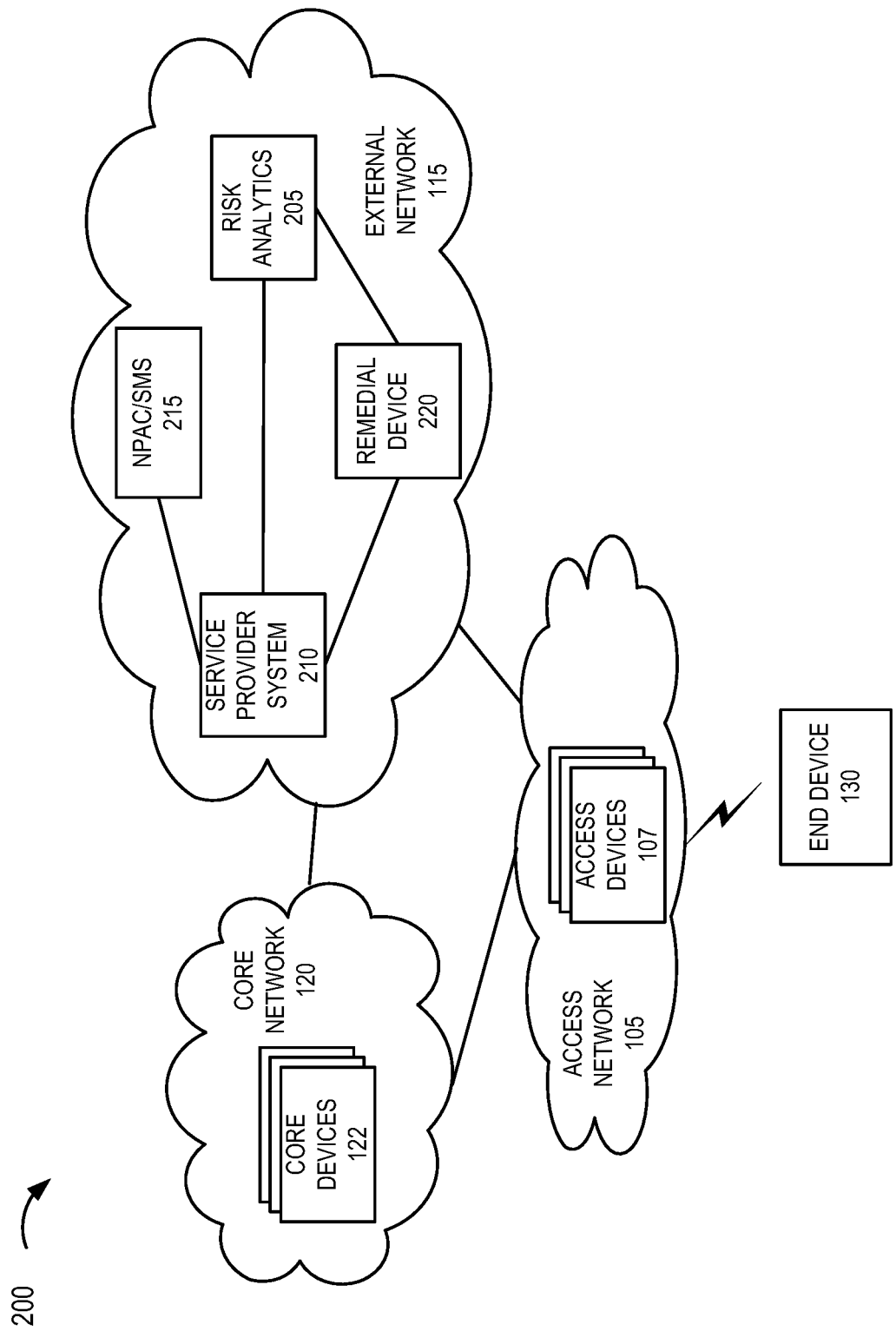
FIG. 2 is a diagram illustrating another exemplary environment in which exemplary embodiments of the onboarding risk assessment and remedial service may be implemented.

FIG. 2 is a diagram illustrating an exemplary environment 200 in which an exemplary embodiment of onboarding risk assessment and remedial service may be implemented. As illustrated, environment 200 may include access network 105, core network 120, external network 115, and end device 130, as previously described. As further illustrated, external devices 117 may include a risk analytics device 205, a service provider system 210, a Number Portability Administration Center/Service Management System (NPAC/SMS) 215, and a remedial device 220.

According to other exemplary embodiments, environment 200 may include additional, different, and/or fewer network devices than those depicted and described in relation to FIG. 2. According to some exemplary embodiments, multiple network devices may be implemented as a single network device, and/or a single network device may be implemented by multiple network devices. For example, risk analytics 205 may be included in service provider system 210. Alternatively, for example, risk analytics 205 and remedial device 220 may be combined into a single network device. Additionally, external network 115 may include exemplary communication links between risk analytics device 205, service provider system 210, NPAC/SMS 215, and remedial device 220. Although not illustrated, there may be intermediary network devices and/or networks associated with these exemplary communication links, as previously mentioned.

Risk analytics 205 may include a network device that has logic that provides an exemplary embodiment of the onboarding risk assessment and remedial service, as described herein. For example, risk analytics 205 may include logic that ingests data and/or information pertaining to an onboarding procedure of a user of end device 130. For example, risk analytics 205 may obtain onboarding information from service provider system 210, NPAC/SMS 215, and other network devices (e.g., core device 122, access device 107) that relate to various steps beginning from the initiation to the completion of the onboarding process, as described herein. According to an exemplary embodiment, risk analytics 205 may include artificial intelligence (AI) and/or machine learning (ML) that performs detection, root cause, and/or selection of remedial procedure, as described herein. For example, the AI and/or ML logic may include various learning-based and/or intelligence logic, such as reinforcement-based learning, unsupervised learning, semi-supervised learning, supervised learning, deep learning, and/or other types of device intelligence.

As further described herein, risk analytics 205 may include logic that calculates values for criteria indicative of an onboarding risk based on the onboarding information. Also risk analytics 205 may calculate an overall or total onboarding risk value based on the criteria values. The onboarding risk value may indicate a degree of risk that an issue or a problem completing the onboarding procedure is present. The onboarding risk value may also be indicative of the likelihood that resources (e.g., network resources, end device 130 resources) may be wasted due to an incomplete onboarding procedure and associated failed attempts to complete the onboarding procedure. Risk analytics 205 may determine whether a criterion or criteria is/are satisfied. For example, risk analytics 205 may compare the total onboarding risk value to a threshold value. When the threshold value is satisfied (e.g., total onboarding risk value is equal to or exceeds the threshold value), risk analytics 205 may perform root cause and remedial services, as described herein. Risk analytics 205 may continually monitor and calculate criteria values and a total onboarding risk value for those onboarding procedures and associated users that did not satisfy the threshold value.

Risk analytics 205 may analyze onboarding information to determine a root cause for an error, a failure, and/or an inability to complete a step or operation of the onboarding procedure. According to some exemplary embodiments, onboarding procedures may differ depending on various factors, such as whether the user is transferring a telephone number from an external carrier that does not use a network of the carrier to which the telephone number is to be ported, whether the user is already an active member associated with the carrier/service provider, or whether the user is transferring a telephone number from an external carrier that does use a network of the carrier to which the telephone number is to be ported. Based on identifying the type of onboarding procedure, risk analytics 205 may determine one or more issues or problems based on workflows corresponding to the different types of onboarding procedures and available onboarding information. As an example, risk analytics 205 may determine a category of an issue or an error, such as a data entry category, or risk analytics 205 may determine a particular data entry error or issue, such as a telephone number entry error, a wireless service account number entry error, a missing data entry relating to data or information used to complete the onboarding procedure. Risk analytics 205 may also obtain other types of information, such as error logs, from network devices of service provider system 210 and/or other devices. Risk analytics 205 may read and analyze the logs and identify a type of error or a type of failure. Risk analytics 205 may also isolate or determine which network device pertaining to the onboarding process has indicated and/or contributed to the issue or the error. Additional description regarding the root cause analysis service is provided herein.

Risk analytics 205 may determine and select a remedial procedure to be taken based on the root cause analysis service. According to an exemplary embodiment, risk analytics 205 may prioritize or rank an order of invoking or executing the remedial procedure based on the total onboarding risk value. For example, a total onboarding risk value with a higher value may be ranked or prioritized over another total onboarding risk value with a lower value despite that both total onboarding risk values satisfied the threshold value, as previously mentioned. According to some exemplary embodiments, risk analytics 205 may generate a list or another type of data structure that indicates a precedence for invoking or executing the remedial procedure.

Risk analytics 205 may invoke or execute the remedial procedure, as described herein. For example, risk analytics 205 may perform the remedial procedure or invoke an execution of the remedial procedure via remedial device 220, as described herein. For purposes of description, a remedial procedure may include a diagnostic, an investigative, and/or a corrective procedure. The remedial procedure may lead towards a resolution or resolve an issue, or a problem that prevents successful completion of the onboarding process and may cause wasteful use of resources. The remedial procedure may facilitate a successful completion or cause or provide a successful completion of the onboarding process. Risk analytics 205 may continually monitor the case and the problem signature of the detected issue, and when the problem is resolved and/or the onboarding process is successfully completed, the case may be closed. Risk analytics 205 may generate and manage information pertaining to the remedial procedure(s) taken and the before-and-after problem signature. Risk analytics 205 may also use the generated information for enhancing and optimizing the AI/ML logic.

Service provider system 210 may include network devices that support an onboarding process. For example, service provider system 210 may include a portal that allows users to initiate an onboarding process. For example, service provider system 210 may include a server device that hosts an application users may use to create a porting request. The users may access the server, for example, via an application (e.g., a mobile application, a tool, or another type of software), mobile web, desktop web, and/or another suitable technology. The users may provide various types of information via a graphical user interface. For example, the information may include the user's current service provider, a telephone number, an account number, a personal identification number (PIN) and/or another type of credential/security information. The information may include other types of information of relevance (e.g., name, address, etc.). After the user submits such information, service provider system 210 may use the information (e.g., some or all) to generate a porting request and communicate the porting request to NPAC/SMS 215.

Service provider system 210 may receive a positive or negative response to the porting request from NPAC/SMS 215. For example, a positive response may indicate the porting is pending. According to another example, a negative response may include an error message. For example, the error message may specify a category of the error (e.g., incorrect data entered), a more specific error (e.g., incorrect PIN), or another type of error (e.g., a system failure, etc.). Service provider system 210 may provide response information to risk analytics 205. For example, the response information may indicate that the porting request is pending or was successfully completed. Alternatively, the response information may indicate that the porting request was not successfully completed. When unsuccessful, the response information may indicate further information regarding an error or a failure associated with the porting request.

Service provider system 210 may include a network device that hosts an application or provides a service that allows users to communicate with service provider support. For example, service provider system 210 may enable users to initiate an IM chat session with a real or virtual agent and describe a problem with completing the onboarding process. According to another example, service provider system 210 may enable users to request a subscriber identification module (SIM) card for end device 130, while other end devices 130 may include an electronic SIM (eSIM), for example, or the like.

Service provider system 210 may include a network device that performs a registration procedure included in the onboarding procedure. For example, after NPAC/SMS 215 indicates a successful porting and end device 130 has received and the user has placed a (new) SIM in end device 130 (e.g., new or existing end device 130), the user may complete the onboarding procedure by registering with a network. For example, end device 130 may include software (e.g., mobile application, client application, over-the-air (OTA) application, a wizard application, or the like) that enables the user to initially register end device 130 with the network in view of the ported telephone number. For example, the software may provide a graphical user interface (GUI) via which the user may communicate with service provider system 210. By way of further example, the GUI may provide a prompt and/or an interactive element (e.g., button and/or other type of GUI elements) that may allow the user to be guided through and complete the registration procedure. Service provider system 210 may communicate with core devices 122 (e.g., UDM, HSS, UDR, and/or another type of core device 122 that may manage subscription information and/or may be part of a registration procedure in core network 120) that completes the registration of end device 130 having the ported telephone number.

NPAC/SMS 215 may include a network device that supports local number portability (LNP) and may facilitate number porting (e.g., in the United States and/or another country). For example, NPAC/SMS 215 may support inter-carrier or competitive porting, such as requests to move a telephone number from a current service provider to a new service provider. Additionally, for example, NPAC/SMS 215 may support intra-carrier porting, such as requests to move a telephone number from one switch to another switch (or between other types of network devices) within a same telecommunications service provider's network. NPAC/SMS 215 may support the porting of wireless telephone numbers, wired or landline telephone numbers, and VoIP telephone numbers. NPAC/SMS 215 may fulfill porting requests based on receiving porting information (also called subscription version information) from a service provider network device and/or a carrier network device (e.g., service provider system 210), for example, as described herein.

Remedial device 220 may include a network device that may perform a remedial procedure, such as a diagnostic, an investigative, and/or a corrective procedure based on the root cause analysis service and identified issue, problem, failure, and/or error. According to an exemplary embodiment, remedial device 220 may perform an automated correction regarding a network device that supports the onboarding system. Remedial device 220 may use the identified error/problem information and the information regarding the network device that has indicated and/or contributed to the issue or the error as a basis to select a remedial procedure. According to some exemplary implementations, remedial device 220 may perform a lookup to match the issue and involved network device information to a correlated remedial procedure. For example, remedial device 220 may update or fix a configuration of a network device included in service provider system 210 or end device 130. According to another example, remedial device 220 may issue a ticket or an alert that invokes a network administrator or a developer, for example, to generate a fix for a category or a specific type of issue. According to another exemplary embodiment, remedial device 220 may communicate with the user of end device 130. For example, remedial device 220 may schedule a communication with a service provider support person or indicate a corrective measure to be taken by the user. For example, remedial device 220 may specify a data entry error relating to the porting information or a particular instance of such information (e.g., account number, PIN, telephone number, etc.) that may need correction. According to another example, the remedial procedure may provide an alternate telephone number for the onboarding procedure because the telephone number of the incomplete onboarding is already in use or otherwise unavailable. According to yet another example, the remedial procedure may communicate to NPAC/SMS 215 to indicate a data entry issue in NPAC/SMS 215 or invoke a retry procedure regarding a porting request. According to some exemplary embodiments, risk analytics 205 may perform a remedial procedure, as described herein.

Figure 3A:
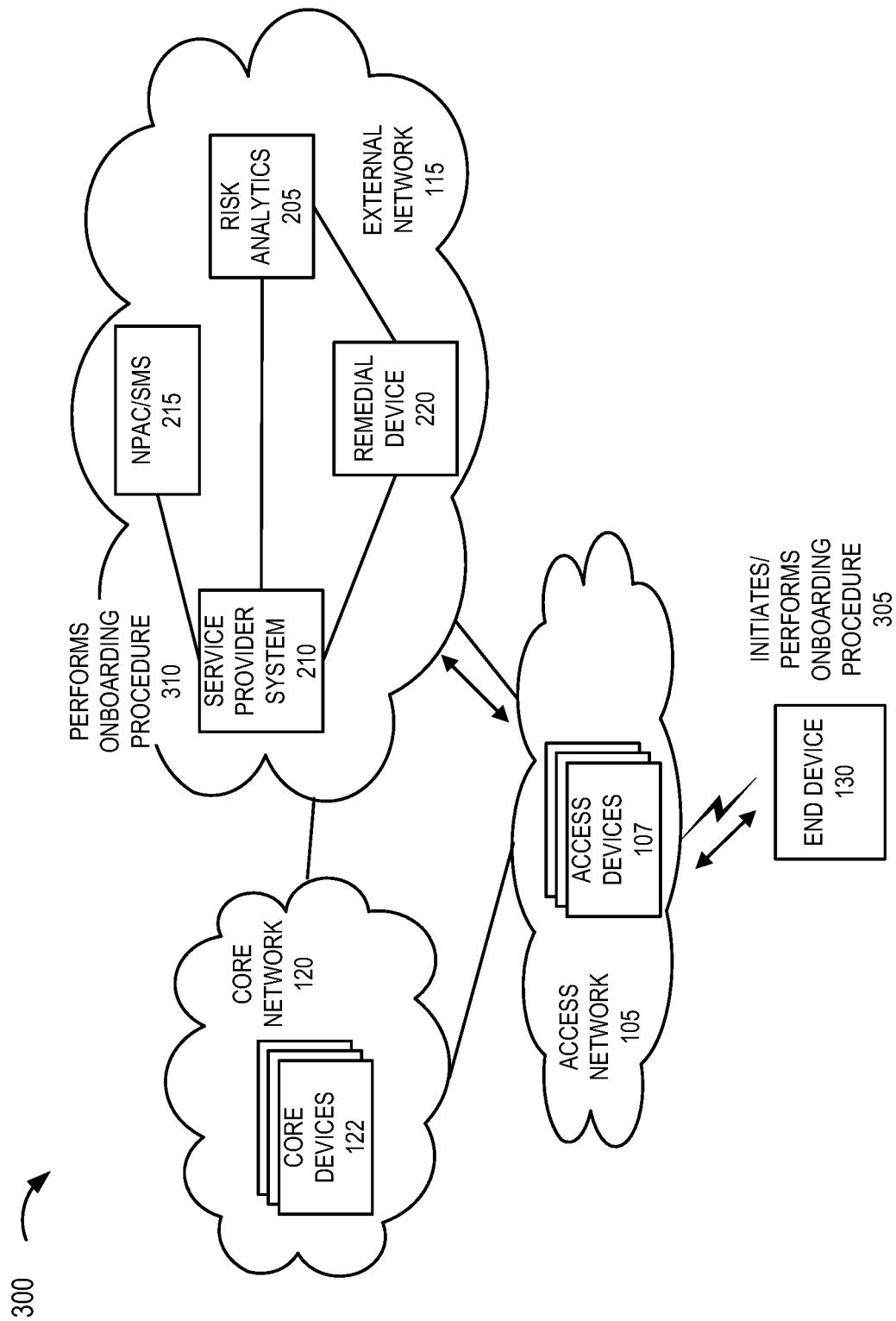
FIGS. 3A-3F are diagrams illustrating an exemplary process of an exemplary embodiment of the onboarding risk assessment and remedial service.

FIGS. 3A-3F are diagrams illustrating an exemplary process 300 of an exemplary embodiment of an onboarding risk assessment and remedial service. Referring to FIG. 3A, according to an exemplary scenario, assume a user (not illustrated) of end device 130 wishes to port a mobile telephone number to end device 130. The user via end device 130 may initiate and perform an onboarding procedure 305 with service provider system 210, which may cooperatively perform an onboarding procedure 310. For example, the user via end device 130 may access a portal, a web server, or another type of application layer interface associated with a wireless service provider to which the telephone number is to be ported. The user may provide onboarding information to service provider system 210 and service provider system 210 may store this information. For example, the onboarding information may include a telephone number, account information, a PIN, and/or other type of information pertaining to the wireless service provider from which the telephone number is to be ported. The onboarding information may also include name of the user and/or other types of information of relevance.

Figure 3B:
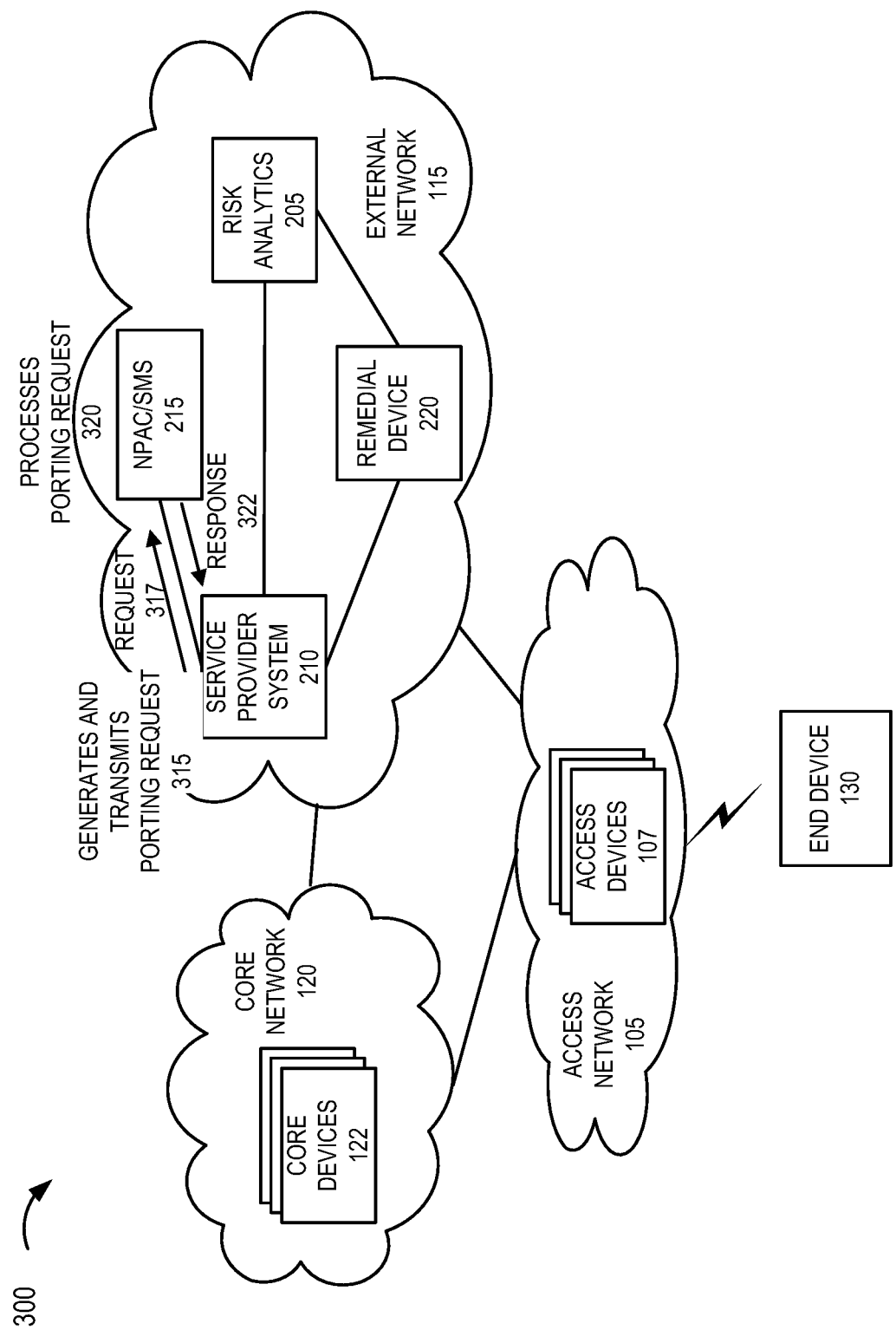

Referring to FIG. 3B, in response to obtaining the onboarding information, service provider system 210 may generate and transmit a porting request 315. For example, service provider system 210 may transmit a request 317 to NPAC/SMS 215. Request 317 may include some or all the onboarding information obtained. In response to receiving request 317, NPAC/SMS 215 may process the porting request 320. For example, NPAC/SMS 215 may read request 317 and perform a lookup in a database relating to the wireless service provider based on the account and PIN information. NPAC/SMS 215 may make a determination relating to the eligibility to port the telephone number (e.g., any pending funding or leasing issues, etc.). Based on a result of the lookup, NPAC/SMS 215 may determine a successful or unsuccessful (e.g., error) porting request. For example, when there is a successful porting request, the porting request may be in a pending state until an activation/registration procedure is completed. Alternatively, the porting request may be unsuccessful due to an error. For example, the error may relate to a data entry issue (e.g., incorrect account information, PIN, telephone, etc.), an eligibility issue, or another type of issue that prevents a successful porting request. In either case, as further illustrated in FIG. 3B, NPAC/SMS 215 may generate and transmit a response 322 to service provider system 210. Response 322 may include data indicating success or data indicating an error, for example.

Figure 3C:
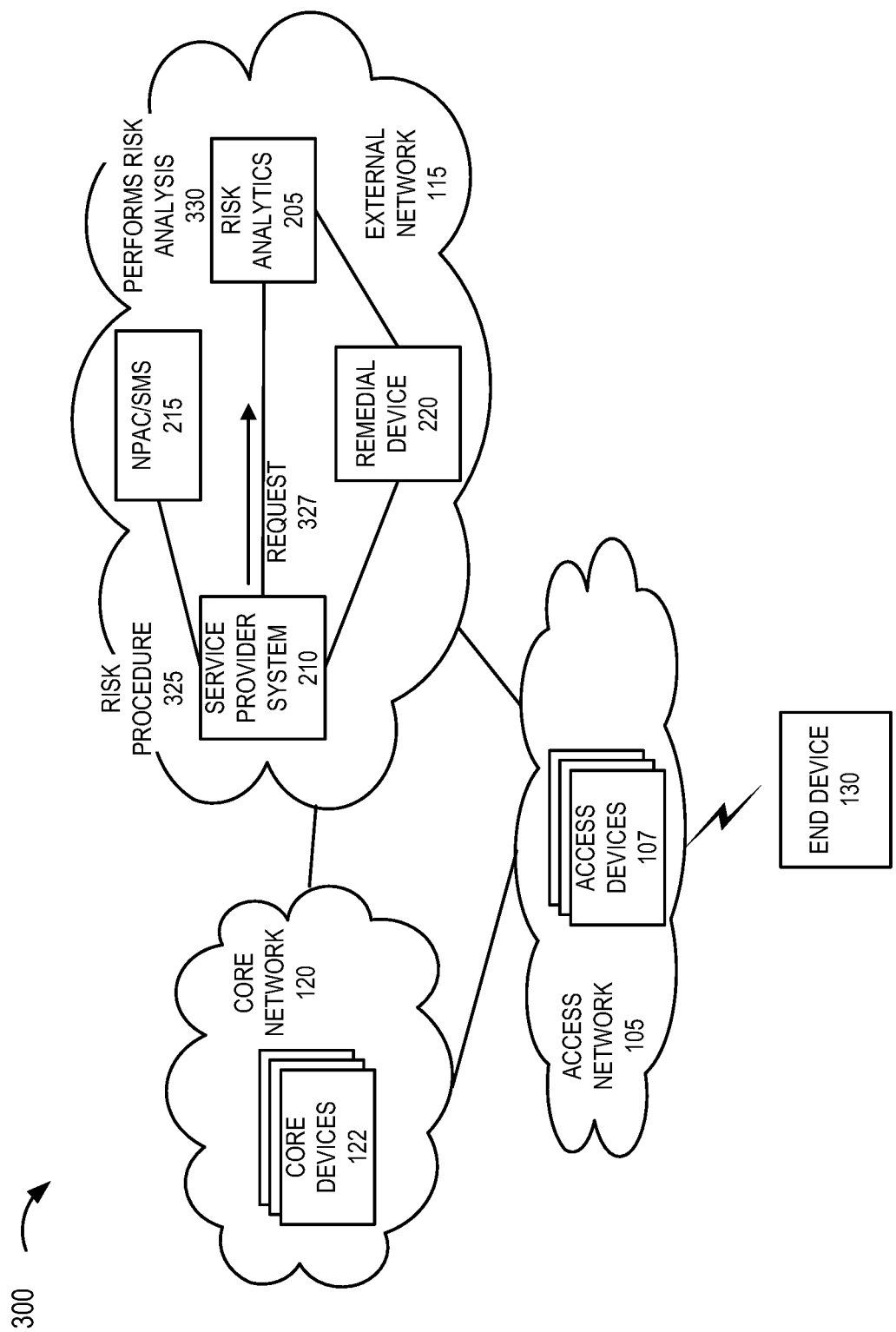

Referring to FIG. 3C, in response to receiving response 322, service provider system 210 may perform a risk procedure 325. For example, service provider system 210 may read response 322 and determine whether an error is present. When an error is present, service provider system 210 may generate and transmit a request 327 to risk analytics 205. For example, request 327 may include error information and a date and timestamp relating to when the porting request was initiated. For example, the date and timestamp may correspond to when request 317 was transmitted, when NPAC/SMS 215 performed the lookup, or when the user provided the onboarding information. The error information may be implemented as an error code that indicates a category of an error or a specific error. Alternatively, when an error is not present, request 327 may include the date and timestamp information and data indicating that a port request is in a pending state, for example.

In response to receiving request 327, risk analytics 205 may perform risk analysis 330. For example, risk analytics 205 may store the error information and the date and timestamp information. Risk analytics 205 may calculate criteria values, which are used to calculate an onboarding risk value, based on the error information and the date and timestamp information. The onboarding risk value and criteria values are described further below. Alternatively, risk analytics 205 may calculate a criterion value related to the date and timestamp information and pending state information, for example.

Figure 3D:
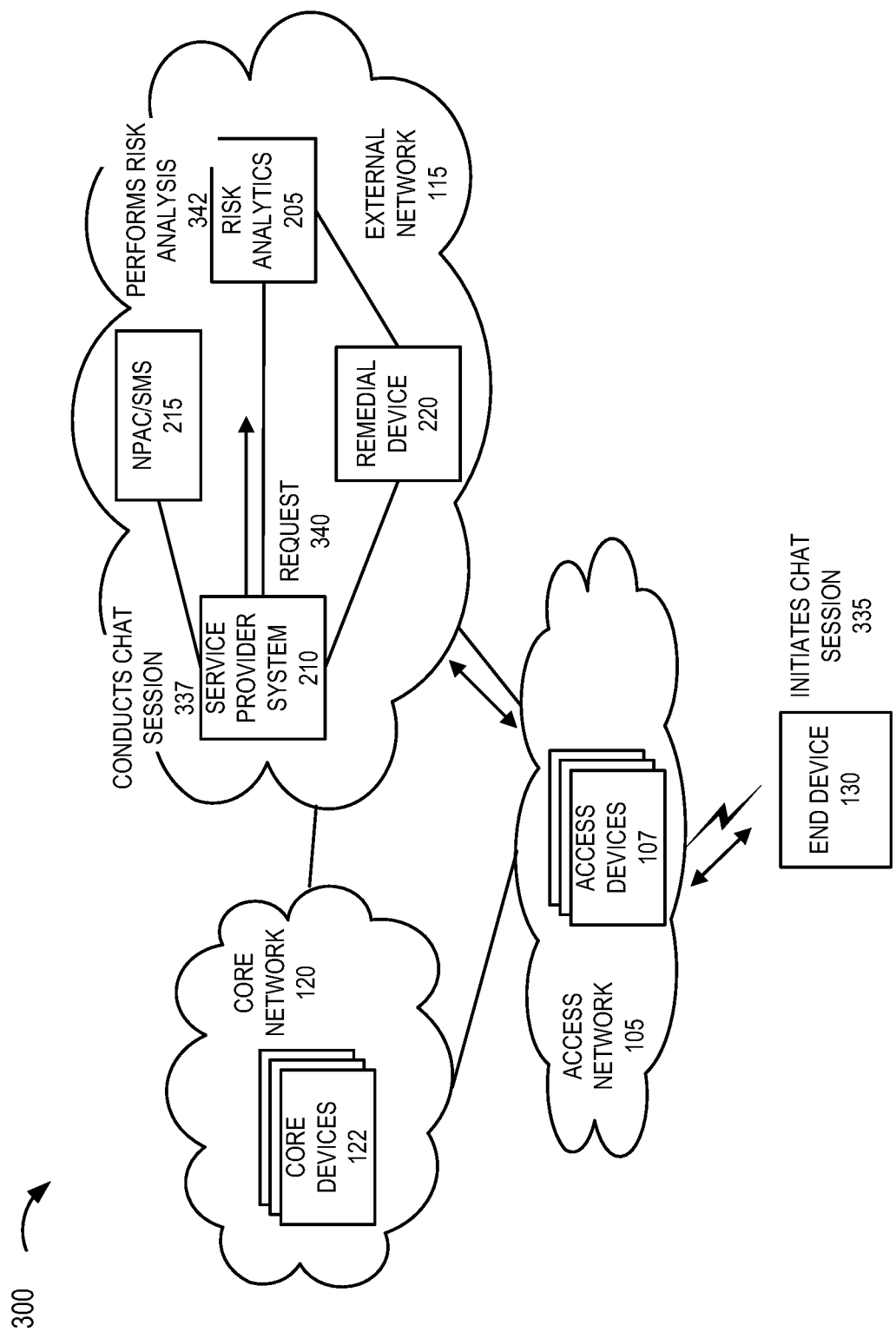

Referring to FIG. 3D, according to an exemplary scenario, the user may initiate a chat session 335 with service provider system 210. There may be various situations with respect to the onboarding procedure that may prompt the user to initiate a chat session 335. For example, the user may not have received a new SIM for end device 130 that relates to the ported telephone number. Alternatively, the user may be unable to successfully activate or register with the network after receiving the new SIM, as described below in relation to FIG. 3E. According to still another example, the user may have difficulty providing onboarding information to create the porting request, as described in FIG. 3A.

As illustrated, service provider system 210 may host or conduct the chat session 337. For example, the chat session may be supported by a virtual agent or a person. Service provider system 210 may identify that the chat session relates to the onboarding process. For example, the user may identify the problem (e.g., specific registration problem, specific SIM problem, or another type of issue) or a category of the issue (e.g., data entry, registration/activation, SIM, or another type of category). Additionally, or alternatively, for example, the user's logging-on process may provide a basis to correlate information regarding a current status associated with the account of the user and/or end device 130. Additionally, or alternatively, the chat system may include semantic interpretation or artificial intelligence to identify the issue, or the person may elicit this information from the user and log this information into a service provider support system of service provider system 210.

As further illustrated, service provider system 210 may generate and transmit a request 340 to risk analytics 205. Request 340 may include data indicating that a chat session occurred. Request 340 may include data indicating a category or a particular issue relating to the chat session. Request 340 may also include date and timestamp indicating when the chat was initiated, duration of the chat session, and/or other information of relevance. Risk analytics 205 may perform risk analysis 342. For example, risk analytics 205 may store the chat session-related information and may calculate criteria values based on this information, as described herein.

Figure 3E:
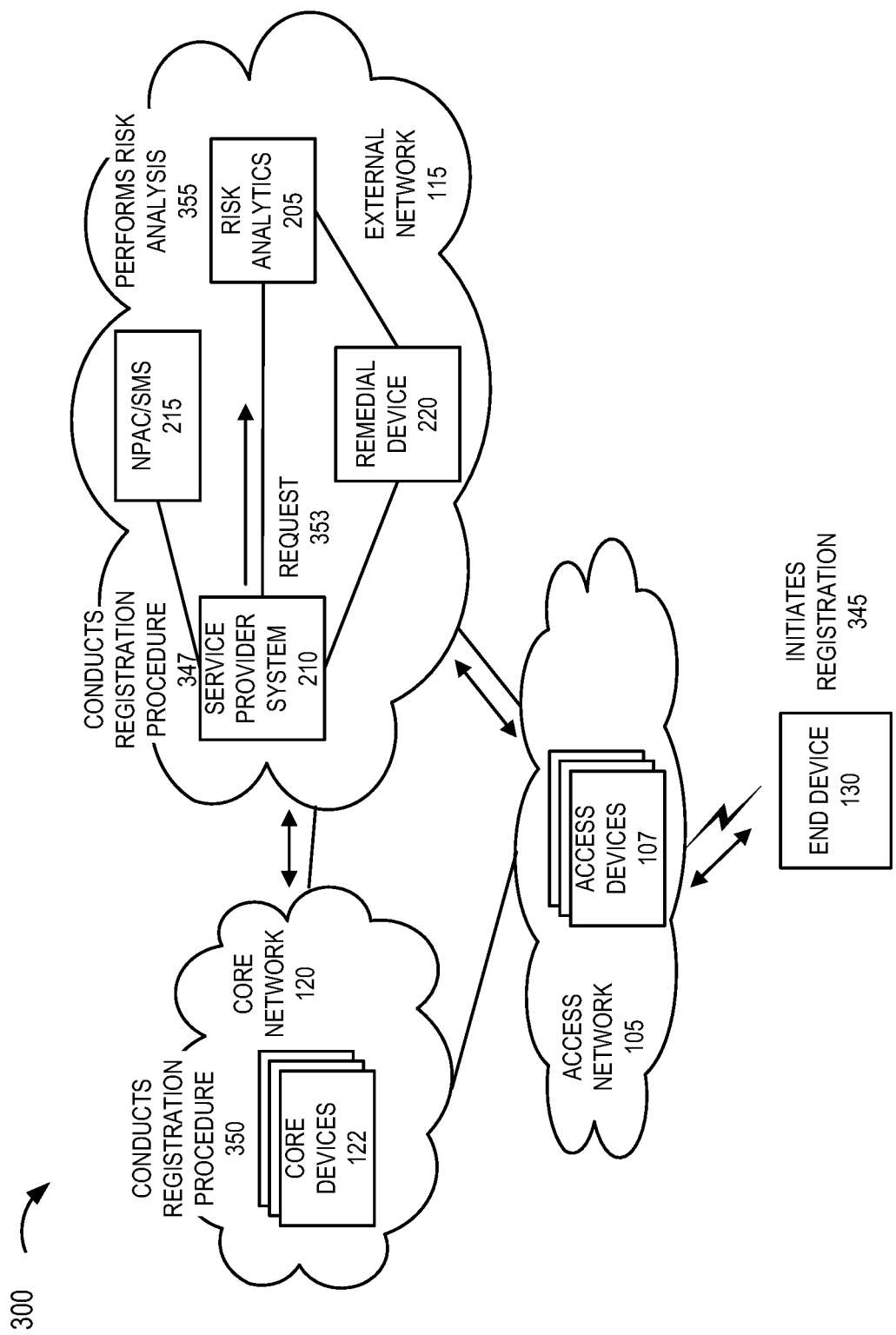

Referring to FIG. 3E, the user via end device 130 may initiate a registration or activation procedure 345. For example, end device 130 may communicate with service provider system 210 to activate end device 130 with the associated ported telephone number onto access network 107 and core network 120. As a part of conducting the (initial) registration procedure 347 for end device 130, service provider system 210 may communicate with a network device of the wireless network, such as core device 122. For example, an HSS or UDR or other core device 122 that may manage subscription information may cooperatively conduct a registration procedure 350 pertaining to end device 130. According to various exemplary scenarios, the registration procedure may be successfully completed or not. Service provider system 210 may receive positive or negative responses relating to the registration procedure. In turn, service provider system 210 may generate and transmit a request 353 to risk analytics 205. Request 353 may include data indicating a successful registration or error information relating to the unsuccessful registration. In response to receiving request 353, risk analytics 205 may perform risk analysis 355. For example, risk analytics 205 may store the registration information, and calculate one or multiple criteria values based on the registration information. As previously described, after an unsuccessful registration procedure, the user may initiate a chat session, as described in relation to FIG. 3D. In this regard, the user may initiate a chat session whenever an issue or a problem occurs regarding the onboarding procedure, as described herein.

Based on data and/or information obtained during one or multiple steps described in FIGS. 3A-3E, and in response thereto, risk analytics 205 may calculate an onboarding risk value. According to an exemplary embodiment, risk analytics 205 may use the following exemplary expression to calculate the onboarding risk value:

$$ORV = TPI \times PC \times TPIFC^{-1} \times NC \times EC \qquad (1),$$

in which ORV indicates an onboarding risk value (ORV). For example, the onboarding risk value may pertain to a user and may indicate a measure of a likelihood that the user needs assistance (or not) regarding an onboarding procedure. For example, some onboarding risk values may indicate that the user likely does not need assistance and other onboarding risk values may indicate that the user likely does need assistance. Also, the onboarding risk value and/or criteria values may indicate a category of the problem or a particular issue that may be the cause for an unsuccessful completion of the onboarding procedure. As further illustrated in expression (1), the criteria values may include a time since porting initiated (TPI) value, a previous carrier (PC) value, a time between porting initiated and first chat contact (TPIFC) value, a number of cases (NC) value, and an error code (EC) value. According to various exemplary embodiments, risk analytics 205 may use and/or weight some or all of the criteria values to calculate the onboarding risk value.

Referring to expression (1), the TPI value may indicate an interim time period since the user first initiated an onboarding procedure. In some cases, the value of the TPI may eliminate a user that has received a SIM card but has elected to not activate an end device yet. For example, the user may initiate a porting request and upon initiation, a procedure to provide the user with a new SIM may be initiated. A presumed receipt of the SIM by the user may be assigned a preconfigured time period.

The PC value may indicate a risk value associated with the user's previous carrier or service provider. For example, different wireless carriers may vary in difficulty regarding the porting of a telephone number from them. For example, some wireless carriers may use a network of the wireless carrier to which the telephone number is to be ported while other wireless carriers may not. Alternatively, for example, other factors relating to a previous wireless carrier may account for varying difficulties or time periods pertaining to a porting of the telephone number from them.

The TPIFC value may indicate an interim time period between when the user first initiated the onboarding procedure and the user contacted (e.g., chatted or another form of communication) with a user support system. According to some exemplary embodiments, risk analytics 205 may use the inverse or reciprocal of this value (e.g., $TPIFC^{-1}$) such that the sooner the contact, the TPIFC value indicates a higher urgency. The NC value may indicate the number of times the user contacted (e.g., chatted) with the user support system for assistance regarding the onboarding procedure. The EC value may indicate a type of error and/or a risk pertaining to the type of error as such risk relates to the user needing assistance or not. According to other exemplary embodiments, different, additional, and/or fewer instances of criterion to calculate the onboarding risk value may be implemented. For example, a value that indicates an interim time period between when the user first initiated the onboarding procedure and when the user initiated a registration procedure may be considered. According to another example, a value that indicates a number of failed attempts to register and activate end device 130 may be considered.

Figure 3F:
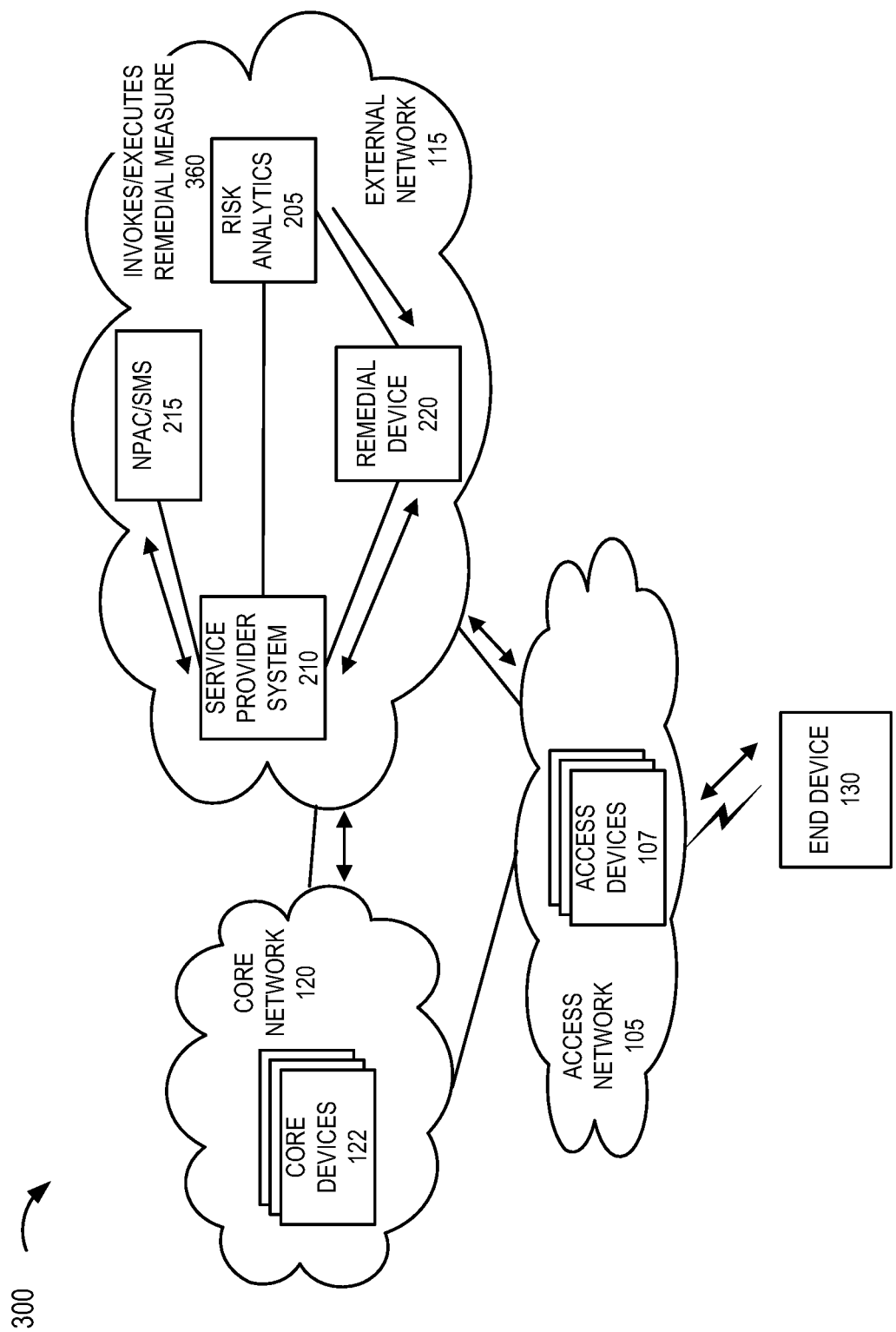

Referring to FIG. 3F, at any stage of the onboarding procedure, risk analytics 205 may invoke or execute a root cause analysis procedure, as previously described. For example, risk analytics 205 may compare the overall onboarding risk value to a threshold risk value. When the overall onboarding risk value does not satisfy the threshold risk value, risk analytics 205 may not invoke or execute the root cause analysis service. However, when the overall onboarding risk value does satisfy the threshold risk value, risk analytics 205 may execute the root cause analysis service. According to some exemplary embodiments, risk analytics 205 may apply multiple threshold values to determine a tier of risk (e.g., low, medium, high, or another set of hierarchical levels of risk) relating to the user and likelihood and/or extent of resources being wasted stemming from failed attempts to complete the onboarding procedure.

According to an exemplary embodiment, risk analytics 205 may determine the type of onboarding procedure pertaining to the user. For example, risk analytics 205 may determine one or more issues or problems based on workflows corresponding to the different types of onboarding procedures and available onboarding information. For example, a workflow of an onboarding procedure may include communication, messages, and information exchanged between end device 130, service provider system 210, core network 120, and/or a third party system (e.g., NPAC/SMS 215), certain operations performed by a device, and so forth. There may be various issues or problems that may occur during the workflow that may prevent the successful completion of the onboarding procedure. For example, there may an issue of fraud or a suspension of an account; various data entry issues, such as missing data, inaccurate data, too many characters of data for a particular GUI field; duplicate porting requests; a requested telephone number is already in use on the carrier's network; a previous carrier may not release the telephone number; an integrated circuit card identifier (ICCID) of a SIM is already paired to another telephone number; a communication link or connection issue in the network; the telephone number is not eligible for porting into service provider system 210; issues stemming from the porting request and NPAC/SMS 215; updating subscriber information (e.g., the telephone number, international mobile subscriber identity (IMSI), international mobile equipment identity (IMEI), and/or other types of identifiers that may be associated with the user and/or end device 130); activation or registration issues; SIM OTA provisioning errors and/or connectivity issues with the network (e.g., a hung process after initiating the registration procedure, improper usage of a registration application by the user (e.g., not selecting a certain interactive element, or other types of communication failures)); SIM detection failure, email validation failure, payment failure; the telephone number and/or the ICCID (or other type of identifier) is/are being reused without proper deactivation; the telephone number and/or the ICCID (or other type of identifier) are not recognized or found by service provider system 210; incorrect pairing between the telephone number and the ICCID (or other identifier); and/or another type of error that prevents successful completion of the onboarding procedure.

Risk analytics 205 may select a remedial procedure responsive to the root cause analysis service and associated error, problem, or issue. Risk analytics 205 may use the identified error/problem information and the information regarding the network device that has indicated and/or contributed to the issue or the error as a basis to select a remedial procedure. According to some exemplary implementations, risk analytics 205 may perform a lookup to match the issue and involved network device information to a correlated remedial procedure. For example, the remedial procedure may include an update or fix to a configuration of a network device included in service provider system 210 or end device 130. According to another example, the remedial procedure may issue a ticket or an alert that invokes a network administrator or a developer, for example, to generate a fix for a category or a specific type of issue. According to another example, the remedial procedure may include communicating with the user of end device 130. For example, risk analytics 205 may schedule a communication with a service provider support person or indicate a corrective measure to be taken by the user. By way of further example, risk analytics 205 may specify a data entry error relating to the porting information or a particular instance of such information (e.g., account number, PIN, telephone number, etc.) that may need correction. According to another example, the remedial procedure may provide an alternate telephone number for the onboarding procedure because the telephone number of the incomplete onboarding is already in use or otherwise unavailable. According to yet another example, the remedial procedure may communicate to NPAC/SMS 215 to indicate a data entry issue in NPAC/SMS 215 or invoke a retry procedure regarding a porting request. As previously mentioned, according to other exemplary embodiments, remedial device 220 may perform the remedial procedure. Risk analytics 205 and/or remedial device 220 may monitor the case and track the problem signature of the detected issue, and once the issue is resolved, the case may be closed. Also, as previously mentioned, risk analytics 205 and/or remedial device 220 may generate and maintain information regarding the actions and outcomes, as well as the before-and-after signature relating to the issue or problem. The AI/ML logic may also use this information to enhance learning and optimize root cause and remedial services.

FIG. 4 is a diagram illustrating exemplary components of a device 400 that may be included in one or more of the devices described herein. For example, device 400 may correspond to access device 107, external device 117, core device 122, end device 130, risk analytics 205, service provider system 210, NPAC/SMS 215, remedial device 220, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to risk analytics 205, software 420 may include an application that, when executed by processor 410, provides a function and/or a process of onboarding risk assessment and remedial service, as described herein. Additionally, with reference to service provider system 210 and/or remedial device 220, software 420 may include an application that, when executed by processor 410, provides a function and/or a process of onboarding risk assessment and remedial service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces, optical, and/or wired interfaces. For example, communication interface 425 may include one or multiple transmitters and receivers, or transceivers. Communication interface 425 may operate according to a protocol stack and a communication standard. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example. As previously mentioned, communication interface 425 may support the onboarding risk assessment and remedial service, as described herein.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies. For example, risk analytics 205, a network device of service provider system 210, and/or another type of network device, as described herein, may be a virtualized device.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5:
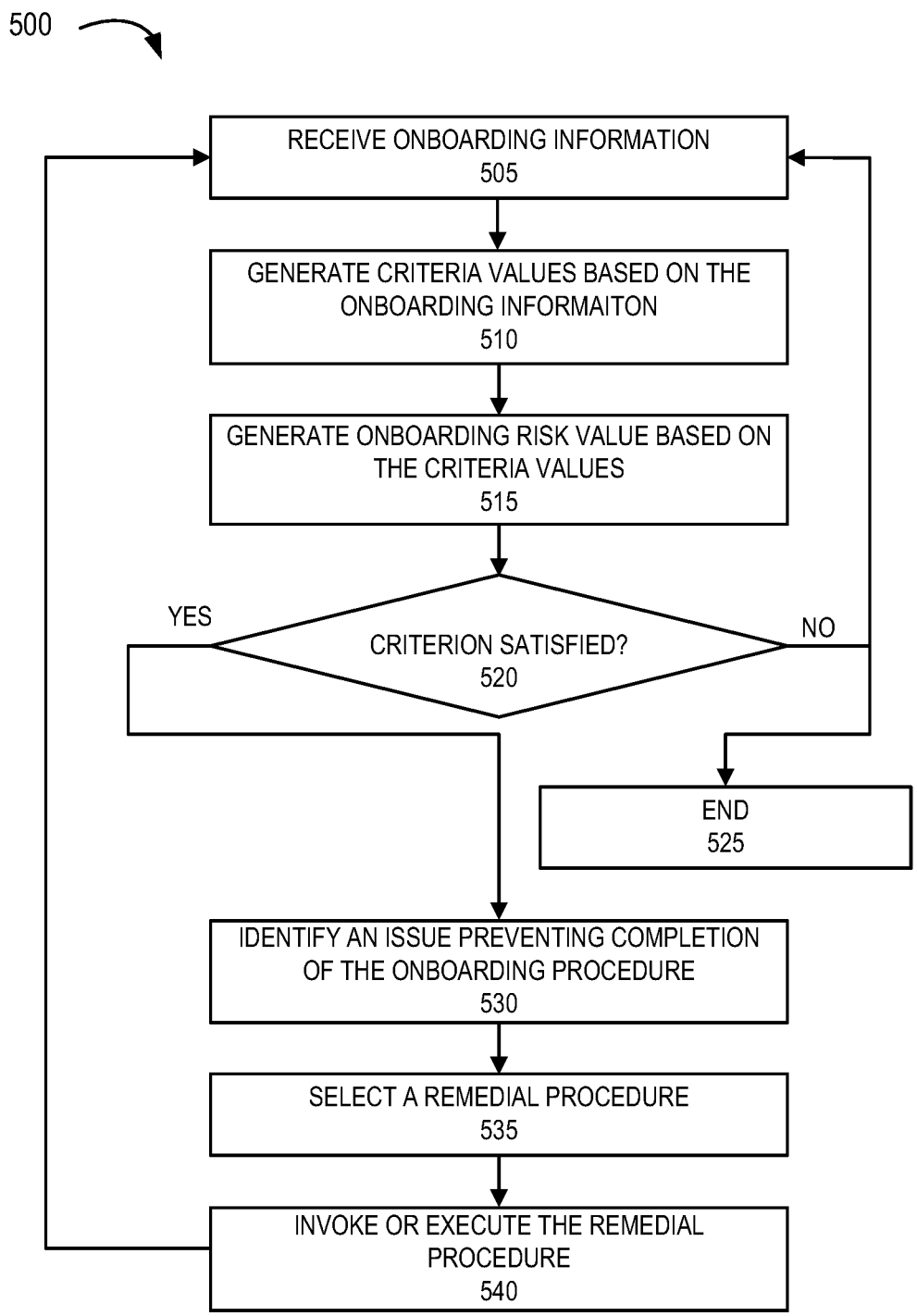
FIG. 5 is a flow diagram illustrating an exemplary process of an exemplary embodiment of an onboarding risk assessment and remedial service.

FIG. 5 is a flow diagram illustrating an exemplary process 500 of an exemplary embodiment of onboarding risk assessment and remedial service. According to an exemplary embodiment, risk analytics 205 and/or remedial device 220 may perform a step of process 500. According to an exemplary implementation, processor 410 executes software 420 to perform the step of process 500, as described herein. Alternatively, the step may be performed by execution of only hardware.

In block 505, risk analytics 205 may receive onboarding information. For example, risk analytics 205 may receive onboarding information from service provider/carrier network devices that provide an onboarding service. The onboarding information may relate to an operation of an onboarding procedure. Risk analytics 205 may receive, directly or indirectly, onboarding information from other types of devices, such as end devices and/or third party network devices.

In block 510, risk analytics 205 may generate criteria values based on the onboarding information. For example, risk analytics 205 may generate some or all of the criteria values, as described herein, depending on the circumstances pertaining to an incomplete onboarding procedure.

In block 515, risk analytics 205 may generate an onboarding risk value based on the criteria values. For example, risk analytics 205 may calculate the onboarding risk value based on some or all of the criteria values.

In block 520, risk analytics 205 may determine whether a criterion is satisfied. For example, risk analytics 205 may compare the onboarding risk value to the threshold value. The threshold value may indicate a value, which if satisfied (e.g., being met or exceeded), may trigger a root cause analysis and remedial service, as described herein. According to various exemplary embodiments, there may be one or multiple threshold values for comparison.

When risk analytics 205 determines that the criterion is not satisfied (block 520—NO), process 500 may end. Alternatively, for example, process 500 may return to block 505 at which risk analytics 205 may receive additional onboarding information over time.

When risk analytics 205 determines that the criterion is satisfied (block 520—YES), risk analytics 205 may identify an issue preventing completion of the onboarding procedure (block 530). For example, risk analytics 205 may perform a root cause analysis that identifies an error and/or a problem pertaining to the onboarding procedure. Risk analytics 205 may identify a type of onboarding procedure, as described herein. Risk analytics 205 may read and evaluate the onboarding information and a criterion value pertaining to the incomplete onboarding procedure. Risk analytics 205 may also request or obtain error logs, which may not be included in the onboarding information, from a network device for evaluation and analysis, as described herein. Risk analytics 205 may select an error or issue, based on the analysis, to be subject of a remedial procedure. Risk analytics 205 may isolate or determine which network device pertaining to the onboarding process has indicated and/or contributed to the issue or the error based on the information obtained, communication with other network devices, and so forth.

In block 535, risk analytics 205 may select a remedial procedure. For example, risk analytics 205 may select the remedial procedure correlated to the selected error or issue and the determined network device. In block 540, risk analytics 205 or remedial device 220 may invoke or execute the remedial procedure. For example, risk analytics 205 may execute or invoke remedial device 220 to perform the remedial procedure. Process 500 may return to block 505. Process 500 may continue until the onboarding procedure is completed or resolved.

FIG. 5 illustrates an exemplary embodiment of a process of onboarding risk assessment and remedial service, according to other exemplary embodiments, the onboarding risk assessment and remedial service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described regarding the processes illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
   calculating, by a network device, an onboarding risk value that indicates a level of risk of a user associated with an incomplete onboarding procedure of an end device that includes activation of the end device with a network and porting a telephone number of the end device;
   comparing, by the network device, the onboarding risk value to a threshold value;
   determining, by the network device, that the onboarding risk value satisfies the threshold value;
   selecting, by the network device in response to the determining, an error pertaining to the incomplete onboarding procedure; and
   performing, by the network device in response to the selecting, a remedial procedure to correct the error, wherein the remedial procedure includes reconfiguring based on transmission of a file, which updates at least one of software of the end device or software of another network device that performed one or more operations of the incomplete onboarding procedure, via a communication link between the network device and the at least one of the end device or the other network device.

2. The method of claim 1, further comprising:
   calculating, by the network device, criteria values based on onboarding information pertaining to the incomplete onboarding procedure; and
   calculating, by the network device, the onboarding risk value based on the criteria values.

3. The method of claim 2, wherein the criteria values include a first value that indicates a first interim time period since the user initiated the incomplete onboarding procedure, a second value that indicates a previous carrier associated with the telephone number, and a third value that indicates a second interim time period between when the user initiated the incomplete onboarding procedure and requesting assistance regarding the incomplete onboarding procedure from a carrier or a service provider to which the telephone number is to be ported.

4. The method of claim 3, wherein the third value is a reciprocal of the second interim time period, and wherein the criteria values include a fourth value that indicates an error code.

5. The method of claim 2, wherein the criteria values include a fifth value that indicates a number of times, since the user initiated the incomplete onboarding procedure, that the user requested assistance regarding the incomplete onboarding procedure from a carrier or a service provider to which the telephone number is to be ported.

6. The method of claim 1, further comprising:
   identifying, by the network device based on onboarding information pertaining to the incomplete onboarding procedure, a type of onboarding procedure from among multiple types of onboarding procedures, and wherein the selecting of the error comprises:
   selecting, by the network device based on the identifying, a root cause of the error.

7. The method of claim 1, wherein the performing comprises:
   determining, by the network device, whether the telephone number is from an external carrier that does not use the network.

8. The method of claim 1, wherein the telephone number is a mobile telephone number, a Voice over Internet Protocol (VOIP) telephone number, or a landline telephone number.

9. A network device comprising:
   a processor configured to:
   calculate an onboarding risk value that indicates a level of risk of a user associated with an incomplete onboarding procedure of an end device that includes activation of the end device with a network and porting a telephone number of the end device;
   compare the onboarding risk value to a threshold value;
   determine that the onboarding risk value satisfies the threshold value;
   select, in response to a determination that the onboarding risk value satisfies the threshold value, an error pertaining to the incomplete onboarding procedure; and
   perform, in response to the selection, a remedial procedure to correct the error, wherein the remedial procedure includes reconfiguring based on transmission of a file, which updates at least one of software of the end device or software of another network device that performed one or more operations of the incomplete onboarding procedure, via a communication link between the network device and the at least one of the end device or the other network device.

10. The network device of claim 9, wherein the processor is further configured to:
    calculate criteria values based on onboarding information pertaining to the incomplete onboarding procedure; and
    calculate the onboarding risk value based on the criteria values.

11. The network device of claim 10, wherein the criteria values include a first value that indicates a first interim time period since the user initiated the incomplete onboarding procedure, a second value that indicates a previous carrier associated with the telephone number, and a third value that indicates a second interim time period between when the user initiated the incomplete onboarding procedure and requesting assistance regarding the incomplete onboarding procedure from a carrier or a service provider to which the telephone number is to be ported.

12. The network device of claim 11, wherein the third value is a reciprocal of the second interim time period, and wherein the criteria values include a fourth value that indicates an error code.

13. The network device of claim 10, wherein the criteria values include a fifth value that indicates a number of times, since the user initiated the incomplete onboarding procedure, that the user requested assistance regarding the incomplete onboarding procedure from a carrier or a service provider to which the telephone number is to be ported.

14. The network device of claim 9, wherein the processor is further configured to:
  identify, based on onboarding information pertaining to the incomplete onboarding procedure, a type of onboarding procedure from among multiple types of onboarding procedures, and wherein the processor is further configured to:
  select, based on the identification, a root cause of the error.

15. The network device of claim 9, wherein the processor is further configured, when performing, to:
  determine whether the telephone number is from an external carrier that does not use the network.

16. The network device of claim 9, wherein the telephone number is a mobile telephone number, a Voice over Internet Protocol (VOIP) telephone number, or a landline telephone number.

17. A non-transitory computer-readable storage medium storing instructions executable by a processor or a network device, which when executed cause the processor to:
  calculate an onboarding risk value that indicates a level of risk of a user associated with an incomplete onboarding procedure of an end device that includes activation of the end device with a network and porting a telephone number of the end device;
  compare the onboarding risk value to a threshold value;
  determine that the onboarding risk value satisfies the threshold value;
  select, in response to a determination that the onboarding risk value satisfies the threshold value, an error pertaining to the incomplete onboarding procedure; and
  perform, in response to the selection, a remedial procedure to correct the error, wherein the remedial procedure includes reconfiguring based on transmission of a file, which updates at least one of software of the end device or software of another network device that performed one or more operations of the incomplete onboarding procedure, via a communication link between the network device and the at least one of the end device or the other network device.

18. The non-transitory computer-readable storage medium of claim 17, wherein the instructions further comprise instructions that when executed cause the processor to:
  calculate criteria values based on onboarding information pertaining to the incomplete onboarding procedure; and
  calculate the onboarding risk value based on the criteria values.

19. The non-transitory computer-readable storage medium of claim 18, wherein the criteria values include a first value that indicates a first interim time period since the user initiated the incomplete onboarding procedure, a second value that indicates a previous carrier associated with the telephone number, and a third value that indicates a second interim time period between when the user initiated the incomplete onboarding procedure and requesting assistance regarding the incomplete onboarding procedure from a carrier or a service provider to which the telephone number is to be ported.

20. The non-transitory computer-readable storage medium of claim 17, wherein the instructions further comprise instructions that when executed cause the processor to:
  identify, based on onboarding information pertaining to the incomplete onboarding procedure, a type of onboarding procedure from among multiple types of onboarding procedures, and wherein the processor is further configured to:
  select, based on the identification, a root cause of the error.

\* \* \* \* \*